United States Patent [19]

Coppola

[11] 4,058,994

[45] Nov. 22, 1977

[54] LOCKING DEVICE FOR SECURING AN OUTBOARD MOTOR TO A BOAT

[76] Inventor: Louis Coppola, 2023 Neptune Ave., Brooklyn, N.Y. 11224

[21] Appl. No.: 645,879

[22] Filed: Dec. 31, 1975

[51] Int. Cl.[2] .............................................. F16B 41/00

[52] U.S. Cl. ........................................ 70/232; 70/159; 70/259; 70/DIG. 26

[58] Field of Search ......... 70/232, 259, 230, DIG. 26, 70/DIG. 34, DIG. 56, 159, 160, 162

[56] References Cited

U.S. PATENT DOCUMENTS

| | | | |
|---|---|---|---|
| 2,181,828 | 11/1939 | Inginer et al. | 70/232 UX |
| 2,315,245 | 3/1943 | Collier | 70/259 X |
| 3,564,879 | 2/1971 | Bennett | 70/232 |
| 3,672,190 | 6/1972 | Palazzolo | 70/232 X |
| 3,745,797 | 7/1973 | Pavek | 70/230 X |
| 3,756,186 | 9/1973 | Nordling | 115/18 R |
| 3,841,466 | 10/1974 | Hoffman | 220/334 X |

FOREIGN PATENT DOCUMENTS

| | | | |
|---|---|---|---|
| 1,045,219 | 11/1953 | France | 70/232 |

*Primary Examiner*—J. Franklin Foss
*Attorney, Agent, or Firm*—Friedman, Goodman & Teitelbaum

[57] ABSTRACT

A locking device for preventing the unauthorized removal of an outboard motor from a boat, where the outboard motor is clamped to the boat by a C-clamp, which is bolted to the stern of the boat. The locking device includes a casing which has holes aligned with the holes in the clamp to accommodate the bolts which can pass through the casing prior to their entry into the clamp thereby holding the casing in abutting relationship with the clamp while the boltheads are contained internally of the casing. A cover for the casing is pivotally connected to the casing at one end thereof, and contains a locking member at the other end therefor for securing the cover to the casing.

3 Claims, 7 Drawing Figures

LOCKING DEVICE FOR SECURING AN OUTBOARD MOTOR TO A BOAT

BACKGROUND OF THE INVENTION

This invention relates to locking devices and more particularly to a locking device for securing an outboard motor to the stern of a boat thereby preventing its unauthorized removal.

In most types of boats, an outboard motor is coupled to the stern of the boat by various clamping assemblies. Since the motor can easily be removed from the boat, the prior art includes various types of locking arrangements for securing the outboard motor to the boat and preventing its unauthorized removal. Most of the prior art locks are specifically designed for particular types of clamp assemblies of the type which includes a clamp arm that engages one side of a transom and includes a manipulative bolt that engvges the other side of the transom. A typical lock is decribed in U.S. Pat. No. 3,731,504, which provides an enclosure around the clamp bolt and prevents the bolt from being rotated which would loosen its hold over the transom. Another arrangement of a lock is described in U.S. Pat. No. 2,592,772 which includes a lock strap that fits over the clamp and is held in place by means of a standard padlock. Other locking arrangements include apparatus which can be installed inside the transom of the boat and participates in the installation of the outboard motor onto the stern of the boat. Such combination boat mountings and locks are described in U.S. Pat. No. 2,798,369. A further motor lock is described in U.S. Pat. No. 2,500,375 which provides a housing over a wing nut used to tighten a clamp bolt onto one side of the stern while the other part of a clamp is held on the inside of the stern.

While the aforedescribed prior art locking devices may find specific use in particular circumstances, they are all generally limited to smaller type boats wherein the outboard motor fits over the top of the stern. For example, in row boats, the outboard motor is placed near the top of the stern and a clamp fits over the top to hold the motor onto the stern. However, in larger type boats, the outboard motor is not placed at the top of the stern edge, but is rather positioned at the bottom of the stern and is clamped to a mounting on the back of the boat, typically by means of C-clamps. The particular structure of the prior art locking devices could not be utilized with such clamping arrangements. Furthermore, while the prior art devices were concerned with enclosing the bolthead or wing nut and prevent its being turned, it has not prevented unauthorized individuals from cutting through the bolt itself and thereby removing the outboard motor from the stern of the boat.

One reason why the prior art was not concerned with the larger type boats was the assumption that the small type rowboats with lighter outboard motors were the only targets for criminals, since the motors could be easily removed. However, it has been found that outboard motors are also being stolen from larger type boat by removing the C-clamps holding the motors, or by actually cutting through the bolts themselves.

SUMMARY OF THE INVENTION

Accordingly, it is an object of this invention to provide an improved locking device for securing an outboard motor to a boat.

A further object of the present invention is to provide a locking device for securing an outboard motor to a boat, which device is not susceptible to being cut with bolt cutters.

A further object of the present invention is to provide a locking device for securing an outboard motor to a boat and including means which seal the bolts as well as the boltheads.

Still a further object of the present invention is to provide a locking device for securing outboard motors to a boat, wherein the outboard motor is not placed over the top of the stern of the boat.

Yet a further object of the present invention is to provide a locking device for securing an outboard motor to a boat wherein the outboard motor is held to the stern of the boat by means of a C-clamp and bolts.

Yet another object of the present invention is to provide a locking device for securing an outboard motor to a boat which is economical to manufacture, durable in use, and easy to manipulate.

Briefly, the invention describes a locking device for locking an outboard motor onto a boat for preventing its removal from the boat, wherein the motor is secured to the boat by a clamp having holes therein with bolts passing through the holes and into a mounting on the stern of the boat, the boltheads firmly holding the clamp in place. The locking device includes a casing having a rear wall, top and bottom walls, and two side walls. The rear wall includes holes which are aligned with the holes in the clamp so as to receive the bolts prior to their passing into the clamp, whereby the rear wall will be secured in abutting relationship to the clamp and the boltheads will be situated internally of the casing. A cover for the casing is pivotally connected to the casing at one end thereof, and a locking means secures the cover to the casing.

In one embodiment wherein the clamp is a C-clamp, the rear wall of the casing is cutout to accommodate the cylindrical shape of the C-clamp so as to closely fit against the clamp.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawing, like reference characters designate like parts.

DESCRIPTION OF THE PREFERRED EMBODIMENT

Figure 1:
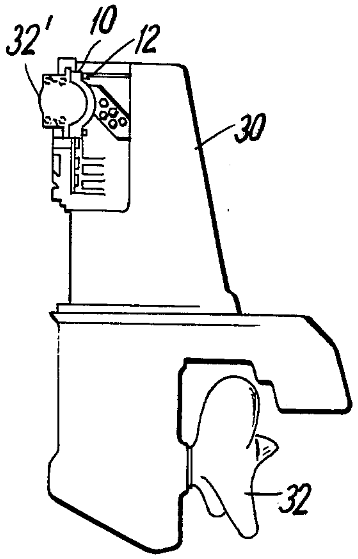
(PRIOR ART) FIG. 1
FIG. 1 is a side elevational view of an outboard motor including its mounting clamp, as is utilized in the prior art.

Referring now to FIG. 1 there is generally shown a stern drive or an outboard motor at 30, which includes an engine adapted to drive a propellar 32 to operate a boat. With larger type boats, the motor is positioned in the middle or the bottom of the stern of the boat, and is coupled to the stern by means of a C-clamp 10 connected to a mounting 32' on the stern by means of bolts 12 which pass through the C-clamp and into the mounting. The boltheads abut the outside of the C-clamp and firmly hold it in place.

Although the size and weight of the outboard motor is very great, nevertheless it has been found that these motors are the object of burglaries and are frequently removed from the boat. Such removal is either accomplished by loosening the bolts and removing the clamp, or by actually cutting through the bolts or the clamp itself. The locking device of the present invention serves to secure the outboard motor to the boat by completely covering not only the bolts and boltheads, but the clamp as well, so as to prevent access to the clamp and thereby prevent removal of the outboard motor.

Figure 4:
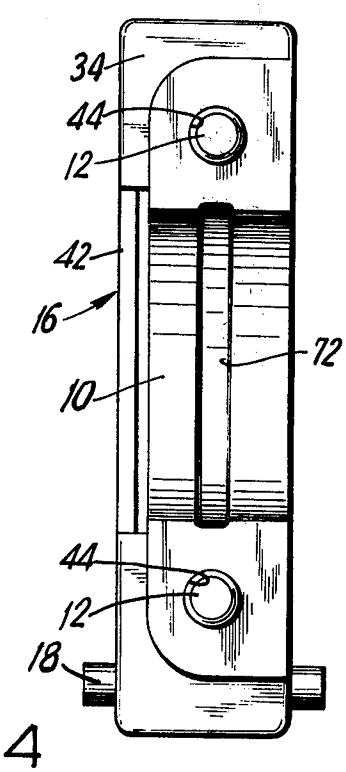
FIG. 4 is a rear view of the casing of the locking device in accordance with the present invention.
Figure 5:
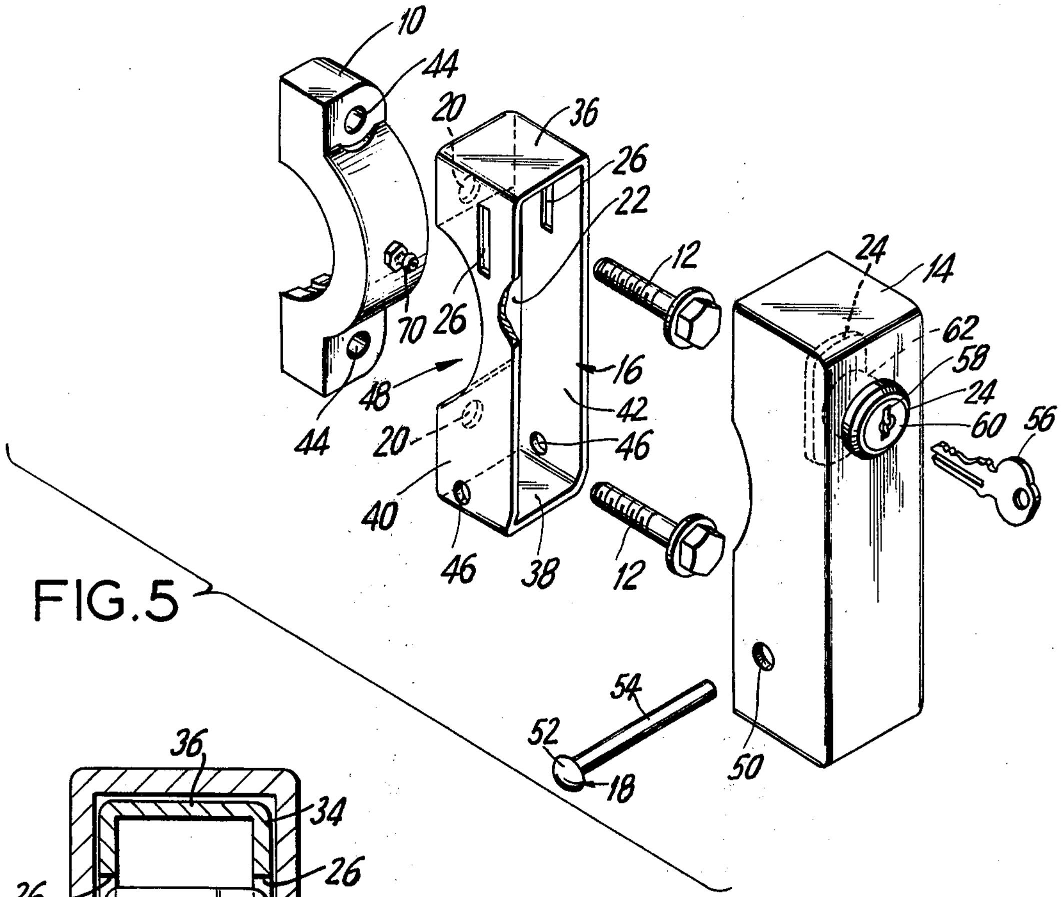
FIG. 5 is an exploded perspective view of the locking device in accordance with the present invention.

Referring now to the other figures, the locking device of the present invention includes a casing 16 having a rear wall 34, a top 36 and a bottom 38, and sidewalls 40 and 42 as best shown in FIGS. 4 and 5. The rear wall 34 includes holes 20 which are aligned with the holes 44 contained in the clamp. The side walls 40, 42 contain substantially identical longitudinal slots 26 on the upper part of each and contain axially aligned holes 46 on the lower part of each. One side wall 42 is shown as a solid wall while the other side wall 40 contains a cutout 48 which matches the curvature of the C-clamp 10. The rear wall 34 has its center section removed to accommodate the curvature of the C-clamp 10.

Figure 2:
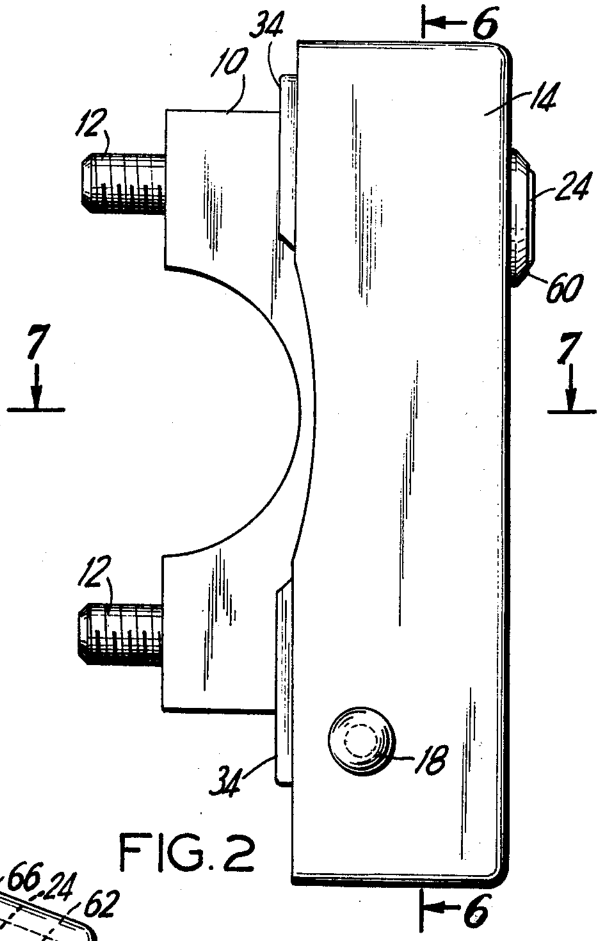
FIG. 2 is a side elevational view of the locking device in accordance with the present invention, as it appears in the closed position.
Figure 3:
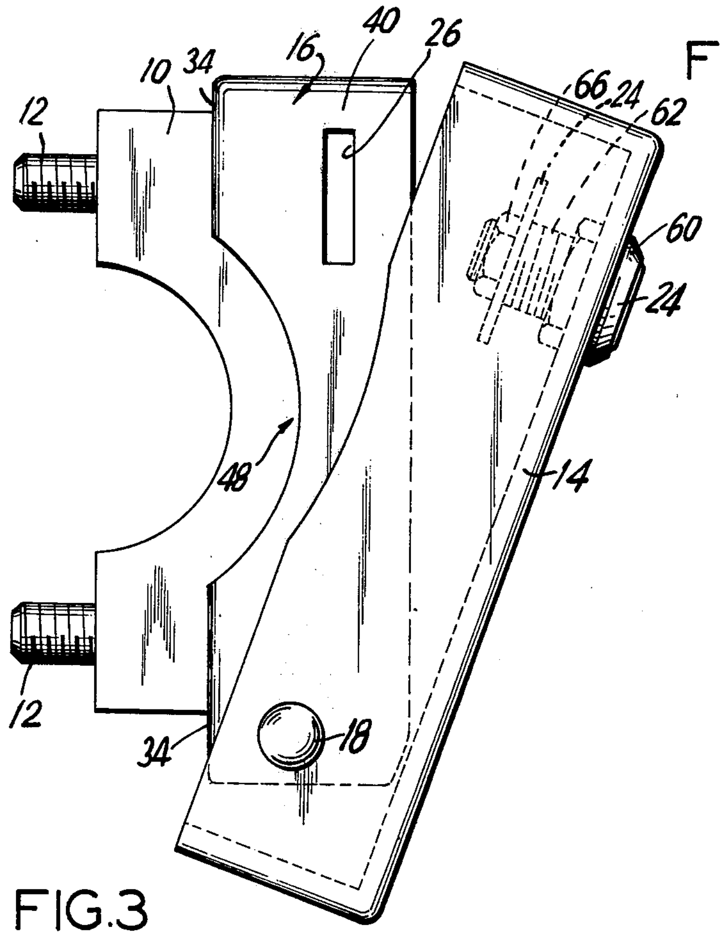
FIG. 3 is a side elevational view of the locking device in accordance with the present invention, as it appears in the open position.
Figure 6:
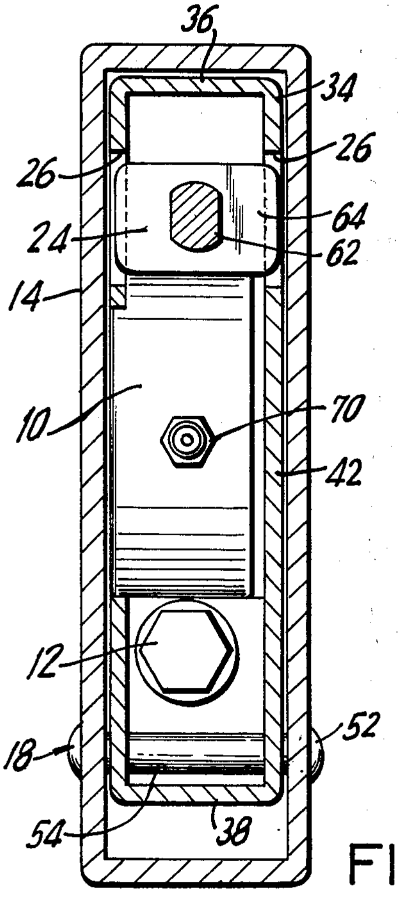
FIG. 6 is a side sectional view taken along line 6—6 of FIG. 2.
Figure 7:
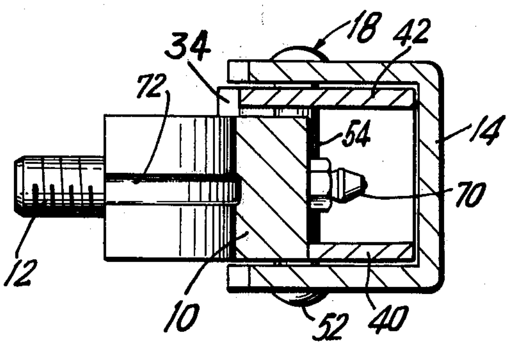
FIG. 7 is a top sectional view taken along line 7—7 of FIG. 2.

A cover 14 of substantially box-like shape, as best shown in FIGS. 2, 3 and 5, fits over the casing and contains holes 50 on either side thereof which are axially aligned with holes 46 in the casing. A rivet 18 passes through the axially aligned holes 46, 50 and includes rivet heads 52 which remain on the outside of the cover 14 as shown in FIGS. 6 and 7. The shaft 54 passes through the cover wall and transversely through the bottom of the casing 16. The rivet heads 52 may be formed on the rivet 18 after the rivet 18 is passed through the associated holes, as indicated in FIG. 4, or one rivet head 52 may be formed before as shown in FIG. 5 and the other rivet head 52 formed after insertion.

The rivet 18 serves both to connect the cover to the casing and also permits pivotal rotation of the cover with respect to the casing. To accommodate such rotation, the length of the casing is slightly shorter, than the length of the cover, with the top of the cover fitting closely over the casing and the bottom of the cover spaced from the bottom of the casing.

A lock 24 is located in the cover for securing the cover to the casing. The lock is a conventional key operated lock with a key 56 capable of entering into the key slot 58 on face plate 60 positioned externally of the cover and connected to a lock cylinder 62 which extends internally of the cover. Connected to the central shaft or plug of the lock 24 is a substantially rectangular bar 64 secured by nut 66. When the key 56 turns the plug in the lock cylinder, the bar 64 rotates therewith. The size of the bar is such that in its closed position it will extend into the longitudinal slots 26 on the side walls of the casing. In its open position it will be disposed between the side walls of the casing.

The locking device of the present invention is utilized as follows. Prior to insertion of the bolts 12 into the holes 44 of the C-clamp 10, the casing 16 is placed adjacent to the clamp and the bolts inserted through the aligned holes 20 in the casing and then through holes 44 of the clamp to be threaded into the mounting 32'. The bolts will therefore tightly secure the casing to the clamp, with the boltheads being positioned internally of the casing. The size of the casing is larger than the clamp so as to substantially prevent any accessibility to the clamp. The front of the casing is open to permit easy access for tightening the bolts in place. The cover is pivotally coupled to the casing to permit it to drop downwardly during tightening of the bolts into the mounting 32'. After the casing has been securely connected to the clamp, the cover is swung up on to the casing and by means of the key inserted in the lock, the rectangular lock bar is rotated to slide within the longitudinal slots 26 thereby locking the cover to the casing.

In a closed position, the cover completely encloses the casing to prevent any access thereto. Also, the clamp is almost completely enclosed therein to prevent any access to the clamp. The boltheads are also completely contained within the casing and the bolts themselves extend directly from the casing into the clamp to prevent any access to the bolts.

A lube fitting 70, shown in FIGS. 5–7, fits in a lube hole and may typically be located on the C-clamp permitting lubrication of a bearing contained and held by the C-clamp. The lubrication passes in a conventional manner into a groove 72 on the inner circumference of the C-clamp. Because the front of the casing is open, there is easy access to the lube fitting for lubrication of the bearing by simply opening the cover and letting it swing into a downward position leaving the lube fitting exposed for applying lubrication.

By making at least one wall 40 of the casing notched to match the curvature of the C-clamp, it is possible to position that wall slightly inwardly to have a narrow casing and thereby permit the cover to be narrower. In many outboard motors, there is provided limited spaced adjacent to the clamp and a very narrow locking device is required. The device of the present invention can be made extremely narrow and can accommodate such outboard motor structures.

The locking device of the present invention can therefore be easily applied to each existing clamp holding the outboard motor. Furthermore, because the cover is pivotally connected to the casing, the parts cannot be separated and lost. Additionally, the locking device provides easy access to the bolts holding the clamp and also easy access to any lube fitting contained in the clamp. It furthermore completely encases the bolts as well as substantially encasing the clamp to prevent any access to either the bolts or the clamp, thereby preventing the removal of the outboard motor from the boat.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A locking device for locking an outboard motor against removal from a boat wherein the motor is secured to the boat by a clamp and bolts, the clamp having holes therein and the bolts having boltheads thereon whereby the bolts pass through the holes and into a mounting on the boat so that the boltheads firmly hold the clamp in place, said locking device comprising:

a casing having a rear wall, top and bottom walls, and two side walls, said rear wall having holes therein for alignment with the holes in the clamp and adapted to receive the bolts prior to their passing into the clamp such that said rear wall is secured in abutting relationship with the clamp and the boltheads are situated internally of said casing, said casing having a length greater than length of the clamp to substantially enclose the clamp;

a cover having a front wall, top and bottom walls, and two side walls to define an open box, said cover being larger than said casing to receive said casing in said cover, said rear wall of said casing being spaced from said front wall of said cover by said top, bottom and side walls of said casing in a closed position of said cover;

pin means disposed between said side walls of said casing and said cover for pivotally connecting said cover to said casing for moving said cover between said closed position and an opened position, the clamp and the boltheads being accessible when said cover is in said opened position, said pin means being located at end portions of said casing and said cover adjacent to said bottom walls of said casing and said cover;

said top wall of said cover closely fitting said top wall of said casing in said closed position, said bottom wall of said cover being spaced apart from said bottom wall of said casing in said closed position for permitting pivotal movement of said cover to said opened position;

a pair of aligned substantially identical longitudinal slots, one of said slots being provided in each of said side walls of said casing at an opposite end portion thereof remote from said pin means; and locking means for securing said cover to said casing when said cover is in said closed position, said locking means including a rotatable bar for transversely extending through both of said slots to provide a locked position.

2. A locking device as in claim 1, wherein said pin means includes a shaft and rivet heads at both ends of said shaft, said rivet heads being located outside said side walls of said cover, said shaft passing transversely through a bottom portion of said side walls of said cover and said casing for pivotally securing said cover to said casing.

3. A locking device as in claim 1, wherein said rear wall of said casing has a section thereof removed to accommodate a curvature of the clamp when the clamp is a C-clamp.

* * * * *